US012596554B1

(12) United States Patent
Owen et al.

(10) Patent No.: US 12,596,554 B1
(45) Date of Patent: Apr. 7, 2026

(54) METHOD TO AUTOMATICALLY DEPLOY SOFTWARE DEFINED STORAGE

(71) Applicant: DATA DIRECT NETWORKS, INC., Chatsworth, CA (US)

(72) Inventors: William W. Owen, Marana, AZ (US); Roman Strashkin, Krasnodar (RU); Michael Anderson, Warren, OR (US); Boris Osher, Morgan Hill, CA (US); Anton Skriptsov, Tbilisi (GE)

(73) Assignee: DataDirect Networks, Inc., Chatsworth, CA (US)

( * ) Notice: Subject to any disclaimer, the term of this patent is extended or adjusted under 35 U.S.C. 154(b) by 205 days.

(21) Appl. No.: 18/428,940

(22) Filed: Jan. 31, 2024

(51) Int. Cl.
*G06F 9/44* (2018.01)
*G06F 9/4401* (2018.01)
(52) U.S. Cl.
CPC .................................. *G06F 9/4401* (2013.01)
(58) Field of Classification Search
None
See application file for complete search history.

(56) References Cited

U.S. PATENT DOCUMENTS

| | | | |
|---|---|---|---|
| 11,074,058 B1 * | 7/2021 | Mowatt | G06F 21/105 |
| 11,153,180 B1 * | 10/2021 | Venkata | H04L 41/40 |
| 2015/0039875 A1 * | 2/2015 | Di Cocco | G06F 8/63 |
| | | | 713/2 |
| 2021/0342137 A1 * | 11/2021 | Dawe | H04L 41/0894 |
| 2022/0027137 A1 * | 1/2022 | Hoppe | G06F 8/60 |

* cited by examiner

*Primary Examiner* — Fahmida Rahman
(74) *Attorney, Agent, or Firm* — Rosenberg, Klein & Lee

(57) ABSTRACT

Automatic deployment of software defined storage (SDS) executes bootstrap and site configuration generation phases. The bootstrap phase follows a command for nodes to start a bootstrap process with installation of prerequisite packages, and setting system parameters based on the discovered hardware. When the node is restarted, the required services are automatically started. When all of the expected storage nodes have registered, the next phase of deployment can be executed to automatically generate the site configuration based on the inventory of nodes and storage devices discovered during the bootstrap phase. A storage cluster is created that utilizes the storage resources previously discovered. A single command is used to create and start a storage cluster.

17 Claims, 5 Drawing Sheets

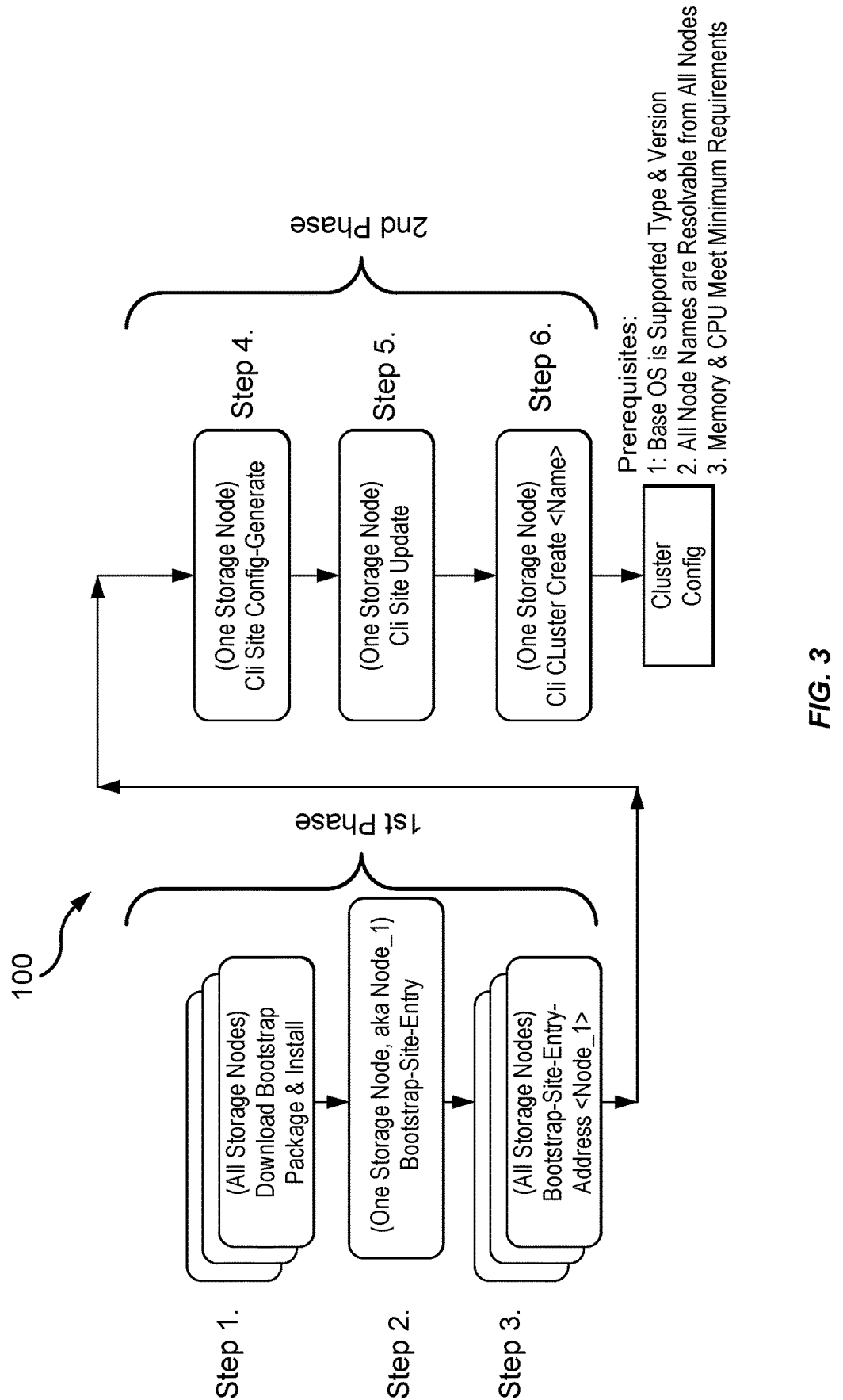

Prerequisites:
1: Base OS is Supported Type & Version
2. All Node Names are Resolvable from All Nodes
3. Memory & CPU Meet Minimum Requirements 2nd Phase Step 4.
(One Storage Node)
Cli Site Config-Generate Step 5.
(One Storage Node)
Cli Site Update Step 6.
(One Storage Node)
Cli CLuster Create <Name>

Cluster Config

1st Phase

100

Step 1.
(All Storage Nodes)
Download Bootstrap
Package & Install

Step 2.
(One Storage Node, aka Node_1)
Bootstrap-Site-Entry

Step 3.
(All Storage Nodes)
Bootstrap-Site-Entry-
Address <Node_1>

*FIG. 3*

METHOD TO AUTOMATICALLY DEPLOY SOFTWARE DEFINED STORAGE

FIELD OF THE INVENTION

The present invention addresses a method and system for automatic deployment of software defined storage.

More in particular, the present invention relates to the automatic deployment of software defined storage which encompasses automatic discovery of available resources, automatic bootstrapping/tuning of a base system, automatic registration of qualified data storage nodes, and automatic distribution of Software Defined Storage (SDS) images to the qualified data storage nodes.

The present invention also relates to automatic deployment of software defined data storage in distributed data storage systems with the advantages of minimizing time required to deploy SDS cluster and minimizing data storage administrator effort, thus minimizing/overcoming possible human errors associated with storage deployment to insure consistent deployment across a SDS cluster, where the deployment of software defined storage does not require high skill level of storage administrator necessary for deployment of SDS cluster which may include an enormous number of data storage nodes (up to hundreds of storage nodes).

In addition, the present invention addresses a data storage system, for example, the RED system, where the Software Defined Storage (SDS) deployment routine is conducted in two phases with the first phase associated with a bootstrap process on each data storage node, where each data storage node (independently, and in parallel with other data storage nodes) prepares itself for installation of pre-required packages, setting system parameters based on the discovered hardware, and, if necessary, re-starting the data storage node. When the data storage node is re-started, the required services are automatically started, and, when all of the expected data storage nodes have registered, the second phase (site configuration generating) of deployment routine can be executed.

The present invention is also directed to an automatic deployment of software defined storage accomplished in two phase, where in the second phase (upon completion of the first phase's bootstrapping), a site configuration is automatically generated based on the inventory of the registered data storage nodes and storage devices discovered during the first phase's bootstrap process. Finalizing the storage automatic deployment, a storage cluster is created that utilizes the compute and storage resources previously discovered during the first bootstrap phase. The creation of the storage cluster and initiating of the storage cluster is accomplished by a single command, thus finalizing the automatic process of software defined storage deployment and making the storage ready for use.

BACKGROUND OF THE INVENTION

Data storage systems which use linked computers have been widely used to improve performance over that provided by a single computer, especially in extended computations, for example, involving simulations of complex physical phenomena, etc. Conventionally, in a computer cluster, computer nodes (also referred to herein as compute nodes) are linked by a high-speed network which permits sharing of the computer resources and memory.

Distributed storage systems are commonly available which are the infrastructures that can split data across multiple physical servers, and often across more than one data center. Such systems typically take the form of a cluster of data storage nodes with a mechanism for data synchronization and coordination between the cluster's data storage nodes.

In the distributed storage systems, a storage configuration setting, also referred to herein as the storage deployment, is to be performed to make the system ready for use. Storage deployment involves (1) installation of software-packages on base OS and container images that will be used to run the software, (2) defining roles of each cluster node, 930 setting system parameters for optimal performance, (4) setup secure access to the cluster nodes, (5) creating storage cluster, and (6) creating logical entities, like tenants, and assigning resources to those tenants. A mapping of storage to storage pools (also referred to herein as storage clusters) may also be a part of the configuration process. Currently, the task of storage deployment (or storage configuration) is typically a manual procedure which includes configuration of a remote access to data storage nodes, as well as installation of pre-requisite packages. When deploying a configuration with a plurality of data storage nodes (which may be at the level of hundreds of data storage nodes in each cluster), the existing approach is labor- and time-intensive and error-prone, and requires high skilled effort of a data storage administrator.

For each data storage node being configured, a storage administrator is typically required to execute the following set of steps:

A. Verify that hardware meets minimum requirements, and install pre-requisite packages (for example, ipmi-tool, ibutils, linux-modules-extra);

B. Copy a set of product packages to the data storage node, which may be in the quantities of ten or more data storage nodes. To complicate the task, there are numerous different packages that a customer is asked to sort out, depending on what product features are to be enabled;

C. Install those packages;

D. Execute a complex set of configuration steps to setup kernel parameters, Udev rules, Sysctl settings;

E. Enable communication with some management node, typically by creating ssh keys, and copying those keys between the management node and the storage nodes;

F. Add storage nodes into configuration (from the management node);

G. Add storage devices into the configurations. This may range from several to hundreds of storage devices per storage node;

H. Depending on the communication protocol, additional matter configuration and de-bug procedure may be required;

I. In addition, typically some health check and de-bug process is performed that is executed to ensure that the system operates as expected;

J. After the health check succeeds, it is typically needed to create a storage cluster and to partition the storage into different usages; and K. Typically, additional installation or configuration steps are performed for user interface or particular data access protocols.

When deploying a configuration with a plurality of storage nodes, the above-presented (mostly manual) approach is highly labor intensive and error prone, as it includes a human factor during performing the basic storage configuration (deployment) tasks such as adding a storage node to the system, adding a candidate node to the system, creating an array from the disk drive, creating a storage cluster, modifying the storage cluster, creating a storage volume, or modifying a storage volume.

It is therefore highly desirable to explore a method to deploy software defined storage where the administrative effort and time required to deploy a software defined storage cluster would be minimized, and where, by removing human errors, consistent deployment across the software defined storage cluster could be provided.

SUMMARY OF THE INVENTION

It is therefore an objective of the present invention to provide a method and system to automatically deploy Software Defined Storage (SDS) capable of deploying SDS cluster of numerous data storage nodes.

It is another objective of the present invention to provide a time- and labor-efficient method to deploy the software defined storage across a number of data storage nodes in a way that requires minimal effort by the storage administrative team.

It is a further objective of the present invention to provide a method of deployment of software defined storage where the manual procedure for prerequisite setup, remote access to storage nodes configuration, and installation of prerequisite packages is minimized to improve human error prone approach associated with the deployment of the SDS cluster.

It is still an objective of the present invention to provide an automatic approach for deployment of software defined storage involving automatic discovery of available resources, automatic bootstrapping/tuning of the system, automatic registration of all qualified nodes, and automatic distribution of SDS images to all configured storage nodes.

It is another objective of the present invention to provide a method for automatic deployment of the software defined storage (SDS) by (a) downloading and installing pre-requisite packages, (b) executing SDS set-up command for a first storage node in the storage cluster and for remaining storage nodes in the SDS storage cluster, (c) start a first phase bootstrap process on each data storage node (also referred to herein as a storage node or a node), where each node independently and in parallel prepares itself for use by the storage software by an installation of prerequisite packages, (d) setting the SDS system parameters based on the discovered hardware during bootstrapping, and, if necessary, (e) re-start the storage node, and continue the process in the second phase of operation by (f) automatically generating a site (storage) configuration based on the inventory of nodes and storage devices discovered during the bootstrap process, (g) reviewing the storage configuration, (h) applying the storage configuration to bring the storage system to the "available" state, and (i) creating, by a single command, a storage cluster that utilizes the compute and storage resources previously discovered, where at that point the storage is ready for use for performing necessary tasks in the system.

The subject method for automatic deployment of Software Defined Storage (SDS) comprises the following steps of operations:

(a) establishing a data storage system comprising at least one storage cluster associated with a plurality of data storage nodes, (b) operatively coupling an automatic software defined storage (SDS) processor unit to the data storage system, (c) configuring the automatic SDS processor unit for performing the subject automatic SDS deployment process, where the automatic SDS deployment process comprises a first phase mode of operation and a second phase mode of operation performed subsequent to said first mode of operation;

wherein said first phase mode of operation includes:

(d) executing a bootstrap phase of the automatic SDS deployment process for the plurality of data storage nodes to obtain a data storage node inventory and the storage configuration of the plurality of data storage nodes; and wherein said second phase mode of operation includes:

(e) automatically generating a site configuration/phase of the data storage system based on the inventory and storage configuration of the plurality of data storage nodes obtained during the bootstrap phase; and (f) creating one (or more) storage cluster(s) utilizing the inventory, storage configuration of the plurality of data storage nodes, and the site configuration of the data storage system.

Prior to step (d), the subject method includes downloading of prerequisite bootstrap packages, for example, from a cloud storage and installing the bootstrap package in each of the plurality of data storage nodes.

The subject method, in the step (d) selects a leader data storage node of the plurality thereof, and the bootstrap phase is initiated for the leader data storage node by issuing a "site entry" argument, resulting in installation of the prerequisite bootstrap packages and setting the leader node's parameters for the leader data storage node.

In addition, the subject method, in the step (d), selects remaining data storage nodes other than the leader data storage node, and, for each remaining data storage node, initiates the bootstrap phase by sending the site entry (leader) node a "join" request from each remaining data storage node, resulting in installation of prerequisite bootstrap packages, setting each remaining data storage node parameters, and registering each remaining data storage node with the leader data storage node.

In the step (d), upon downloading the bootstrap package, the subject method also provides issuing of the registration request from at least one remaining data storage node, and, upon accepting the registration request, issuing at least one security certificate by the leader data storage node for the at least one remaining data storage node for secure communication with the leader data storage node. A secret key may be sent to the leader data storage node by the remaining data storage nodes to facilitate their registering with the leader data storage node. Upon registering of the remaining data storage nodes with the leader storage node, the remaining data storage nodes wait for the leader data storage node to become available if a registration request is not serviced immediately.

The step (d) also is responsible for configuring network time protocol with a service provider for the leader and remaining data storage nodes.

In the step (d), the data storage node inventory is persisted to a configuration data service processor unit of the leader data storage node.

Upon executing the step (d), the subject method can reboot the leader and/or remaining data storage nodes.

In the step (e), the subject method specifies if an external configuration data service is used. Subsequent to the step (e), the site configuration specification is applied to a collection of the leader and remaining storage nodes registered with the leader data storage node, and shared deployment inventory attributes are published into a configuration file of each data storage node of their collection.

Subsequent to the step (e), the subject method is proceeds by:

deploying specified services across the collection of the leader data storage node and remaining data storage node registered with the leader data storage node, creating a storage cluster refreshing hardware inventory of data storage nodes of their collection, thus providing an up-to-date view of available resources of each data storage node in their collection, adding default configuration settings to the storage cluster configuration, and formatting storage devices specified in the storage configuration for use by the storage system.

The method further proceeds by:

instantiating the storage cluster, and starting the storage cluster using resources and settings in the storage cluster configuration, creating initial metadata objects for the storage cluster configuration, thus making the storage system ready to be used, and modifying the storage cluster configuration if needed.

These and additional aspects, details, objectives, and advantages of this disclosed method will be more apparent from reading the following detailed description of the subject invention in conjunction with the Patent Drawing Figures.

BRIEF DESCRIPTION OF THE DRAWINGS

FIG. 3 is a flowchart diagram representative of the subject method for automatic deployment of Software Defined Storage;

DETAILED DESCRIPTION OF THE PREFERRED EMBODIMENT

Figure 1:
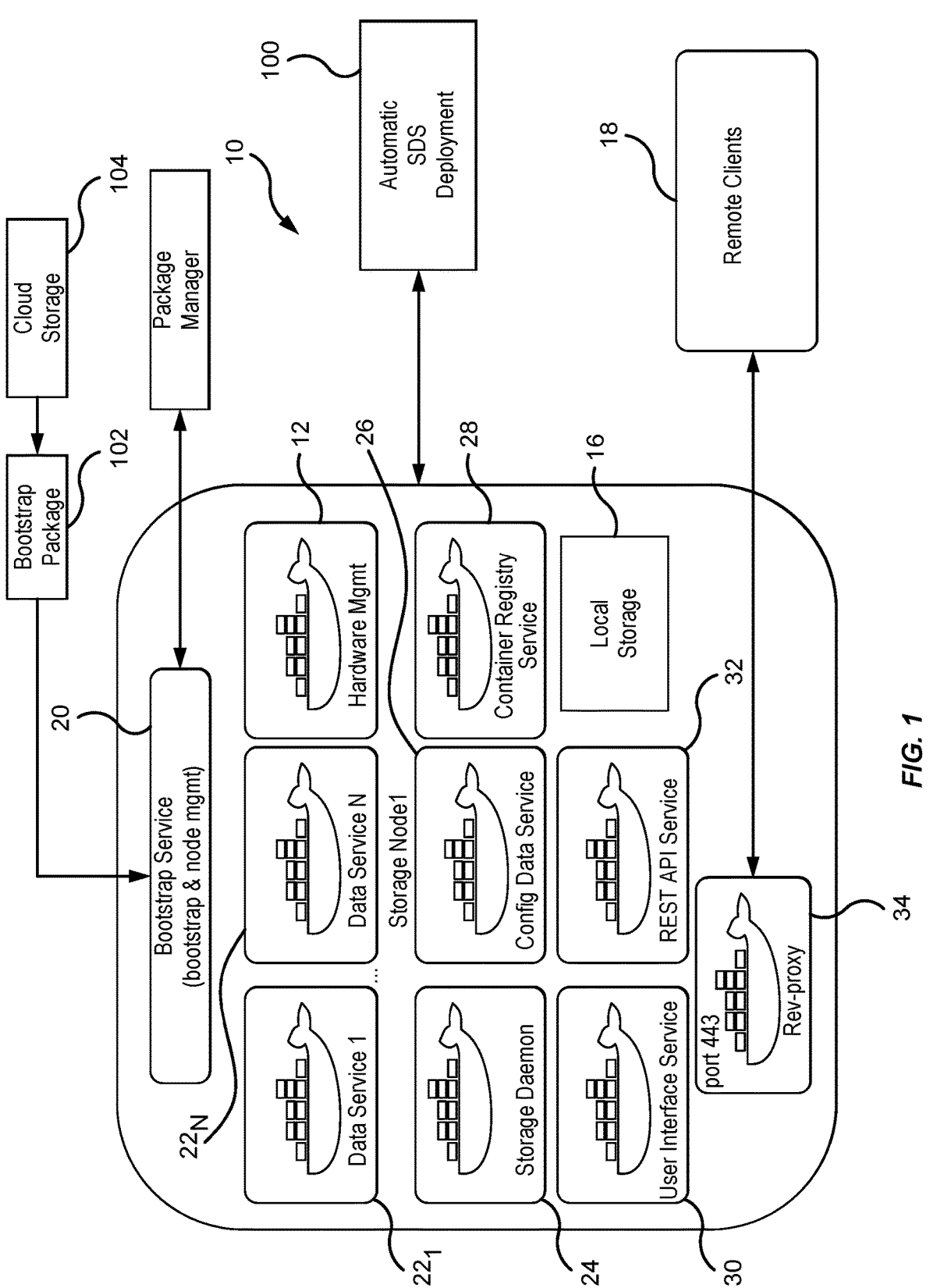
FIG. 1 is a schematic representation of the storage node in an exemplary Software Defined Storage (SDS) system.

Referring to FIGS. 1-3 and 4A-4B, the subject system 10 is a data storage system which includes one or a plurality of compute nodes. The compute nodes in the present system may be either in the form of storage server nodes 12 or client nodes 24, or their combination. The storage server nodes (also referred to herein as peer nodes, servers nodes, servers, or storage nodes) 12, as well as the client nodes 24, may be arranged in groups (also referred to herein as clusters) 14. Both clients and servers cooperate to perform complex computations of various types in numerous areas of applications. The servers also store the results of the computations on the storage devices for short- or long-term storage and retrieval when needed. The clients 24 are represented by local clients 17 and remote clients 18.

The storage nodes 12 are operatively connected through a network communication channel 50. The communication channel 50 is formed between two storage nodes 12 (or between the node 12 and clients 17, 18) to communicate messages therebetween.

The subject SDS automatic deployment sub-system 100 is operatively integrated into the system 10 to support the automatic deployment of Software Defined Storage (SDS) which encompasses, as will be detailed in the following paragraphs, automatic discovery of available resources, automatic bootstrapping/tuning of a base system, automatic registration of qualified data storage nodes, and automatic distribution of SDS images to the qualified data storage nodes. The subject automatic deployment of SDS is advantageous in reducing the time required to deploy SDS cluster and minimizing data storage administrator effort, thus minimizing/overcoming possible human errors associated with storage deployment to ensure consistent deployment across a SDS cluster, where the deployment of software defined storage does not require high skill level of storage administrator necessary for deployment of SDS cluster which may include an enormous number of data storage nodes (up to hundreds of storage nodes).

Figure 2:
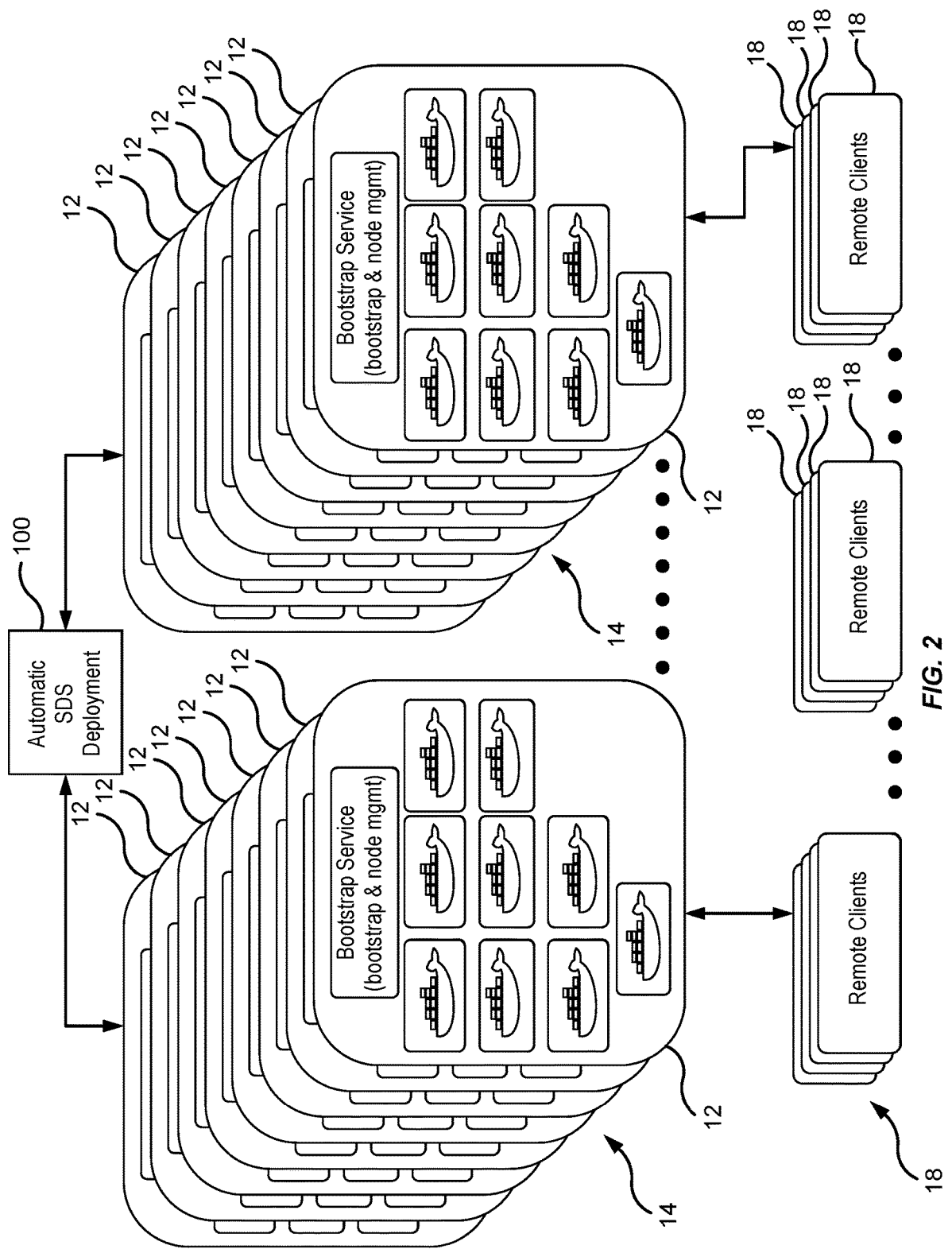
FIG. 2 is a schematic representation of the typical configuration of the container architecture in the exemplary storage nodes.

The subject approach for the automatic deployment of SDS is envisioned to be applicable to numerous data storage systems. In an exemplary embodiment of its numerous implementations, the subject system 10 may be also referred to as the RED system, which will be detailed in further paragraphs. The SDS system 10 may include one or a plurality of computer clusters 14 (also referred to herein as a storage cluster). The cluster 14 is operatively coupled to multiple storage nodes 12 which are coupled to other storage nodes 14 within the same cluster, as well as to storage nodes within remote clusters with a shared network having multiple network interfaces. Each storage node 12 is associated with an array 16 of local storage devices which may be also referred to herein as core affined storage targets (CATS) 112. Each storage node 12 also may communicate with remote clients 18, where, as best shown in FIG. 2, each storage cluster 14 can communicate with a plurality or a single remote client(s) 18.

Referring again to FIGS. 1 and 2, each data storage node (also referred to herein as a storage node, or a node) 12 is configured with the bootstrap service processing unit 20 configured for bootstrap routine and the storage node management purposes. Further, the storage node 12 includes N data service processing units 22 including data service processing units $22_1, \ldots, 22_N$.

Further, the storage node 12 includes a hardware management processing unit 23. Also included in each storage node 12 are storage daemon processing unit 24, configuration data service processing unit 26, container registry service processing unit 28, User Interface service processing unit 30, REST API service processing unit 32, and RED-proxy (port 443) 34 through which the storage node 12 communicates with the remote client(s) 18.

The subject method for automatic deployment of software defined storage is supported by the subject data storage system 10 which may include one (or more) storage cluster(s) 14 associated with a plurality of data storage nodes 12. The subject automatic SDS deployment processor unit 100 is operatively integrated in the system 10 and is configured for executing (a) a first (bootstrap) phase of the automatic deployment process for a plurality of data storage nodes to obtain data storage inventory and the storage configuration, and (b) a second phase for automatically generating a site configuration of the data storage system based on the inventory and storage configuration of the plurality of data storage nodes 12 discovered during the bootstrap phase.

Subsequent to generating a site configuration phase, the automatic SDS of processor unit 100 also creates the storage cluster configuration utilizing the inventory of the data storage nodes and the site configuration of the data storage system computed in the generating the site configuration phase.

Prior to the bootstrap phase of automatic SDS deployment process, the automatic deployment processor unit 100 downloads a bootstrap package 102, for example, from a cloud storage (or from a cloud storage bucket) 104 and installs the bootstrap package 102 in each data storage node 12.

The automatic SDS deployment processor unit 100 further performs the bootstrap phase routine for the leader data storage node (also referred to herein as a site entry node) selected by the admin/user by issuing a specific command, which results in installation of prerequisite packages and setting a security key parameters for the leader node of the plurality of storage nodes 12.

Each of the remaining data storage nodes (other than the leader node) is also exposed to initiating the bootstrap phase routine by issuing a command ("site-entry address leadernode") for each remaining data storage node 12, which results in installation of prerequisite packages, setting each remaining data storage node parameters, and registering each remaining data storage node with the leader data storage node.

For secure communication between the leader and the remaining storage nodes, the security key, which was established for the leader node, also is provided to the remaining data storage nodes to facilitate registering of the remaining data storage nodes with the leader data storage node.

Further, in the bootstrap phase of the automatic SDS process, a local container image registry is configured and started by the container registry service processor unit 28 for the leader data storage node 12, so that required container images are pulled from a secure container image registry and are pushed to the local container image registry.

In the bootstrap phase, for the leader and remaining data storage nodes, a reverse proxy service processor unit 34 is configured and started, a configuration data service processor unit 26 is configured and started, the bootstrap REST API service processor unit 32 is configured and started, and the API service processor unit and User Interface service processor unit 30 are configured and started as well.

Optionally, the rebooting of the leader data storage node and/or remaining data storage nodes may also be performed in the bootstrap phase routine of the automatic SDS deployment process.

In addition, the bootstrap phase provides the services of configuring network time protocol with a service provider for the leader and remaining data storage nodes.

The data storage node inventory of the leader storage node and the remaining data storage nodes is persisted to configuration data service data processor unit 26 of the leader data storage node 12.

During the registering process, the site entry node pulls the required container images from an external registry, and stores those in its local registry. When the remaining nodes register/join the site (also referred to herein as a realm), they subsequently pull the images from the site entry node registry so that they do not need to access external registries. In the registering process, which is controlled by the container registry service processor unit 28, the remaining data storage nodes which wish to register, issue a registration request which is sent to the leader data storage node. Upon accepting the registration request from the remaining data storage nodes, the leader storage node issues a security certificate for the remaining data storage node for communication with the leader data storage node.

In the site configuration generating phase, the automatic SDS processor unit 100 automatically generates, on the leader data storage node, a default configuration specification of each remaining data storage node registered with the leader data storage node hosting the prerequisite services, and modifies inventory attributes allocation for each prerequisite service and data. The services inclusion may be modified for each of the data storage nodes 12 during the site configuration generating phase.

Further, during the site configuration generation phase, the automatic SDS deployment processor unit 100 may apply the site configuration specification to a collection of the storage nodes including the leader and remaining data storage nodes registered with the leader node, publish into a configuration file of each of the data storage nodes the shared deployment of inventory attributes, as well as configure and start specified services with resources required by the specified services, and monitor a state of each of the specified services on each data storage node.

Subsequent to the site configuration generating phase, the specified services may be deployed across the leader data storage node and remaining data storage nodes registered with the leader data storage node, and a storage cluster can be created. In addition, the hardware inventory of the data storage nodes can be refreshed, thus providing an up-to-date view of available resources of each data storage node. Also, the default configuration settings may be added to the storage cluster configuration, and storage devices can be formatted for use by the storage system.

Upon its creation, the storage cluster is instantiated and started using resources and settings in the storage cluster configuration. By creating initial metadata objects for the storage cluster configuration (such as tenant, as well as data set (pool)), for the storage cluster configuration, the storage system is made available for being used and the storage cluster configuration may be modified if needed.

Referring now to FIG. 3, which is representative of the flowchart diagram of the logic routine 100 underlying the subject process for automatically deployment of Software Defined Storage, in conjunction with FIGS. 1-2 and 4A-4B, Steps 1-3 constitute the first phase (mode) of operation, and Steps 4-6 constitute the second phase (mode) of operation of the present routine 100.

In Step 1, each storage node 12, specifically, the bootstrap service processor unit 20, downloads bootstrap package 102 by retrieving the bootstrap package 102 from a package storage repository 103 (which may be the RPM or DEB, etc.), or the cloud storage 104, and installs the bootstrap package 102 in the node 12 using the OS supported package manager (which may be the RPM or APT, etc., package manager tool).

In Step 2, subsequent to Step 1, the subject logic routine 100 executes a setup command with the "-site-entry" argument for one selected storage node (also referred to herein as the leading storage node, or the site-entry node) to start the bootstrap mode of operation (also referred to herein as the first phase of operation). This command starts the bootstrap process on the leading storage node which prepares itself for use by the storage software, including installation of pre-requisite packages, setting system parameters based on the discovered hardware, and, if necessary, restarting the node. With the launching of the bootstrap process, the "-site-entry" argument initiates the following operations performed by the selected leading storage node:

(A) optionally, provides a secret key that must be passed by other storage nodes requesting to register with the selected leading node in the deployment process, (B) obtains list of installed packages, (C) downloads and installs missing pre-requisite packages, if any, (D) configures and starts reverse proxy service 34, (E) configures network time protocol with well-known service provider, (F) downloads any required container images from secure container registry, (G) configures and starts local container image registry, (H) pushes required images to local container image registry, (I) configures the node huge page memory SYSCTL, UDEV, SRIOV, and resource limit settings, (J) configures and starts remaining basic services, including the Configuration data service 26, Bootstrap REST API service 32, User Interface service 30, etc., (K) discovers detailed node inventory, CPU, memory, storage devices and persists in configuration data server 26, and (L) reboots, if changes dictate system reboot is required.

Subsequent to Step 2, the logic advances to Step 3, by executing setup command for remaining nodes with "-site-entry address leader-node" argument to start the bootstrap process for each remaining storage node, i.e., "other than the leading storage node", where each remaining node independently and in parallel prepares itself for use by the storage software, including installation of pre-requisite packages, setting system parameters based on the discovered hardware, and, if necessary, restarting the node. When the node is restarted, the required services are automatically started, and, when all of the remaining storage nodes have registered with the selected leading node, the second phase of the deployment process can be executed (as will be detailed in further paragraphs).

Returning to details of Step 3, by providing the "-site-entry-address node 1" argument, the subject routine 100 initiates the following operations for each remaining storage node:

(A) optionally, accesses and uses the secret key to permit registration with the selected leading storage node (i.e., the site-entry node) to allow registration of each remaining storage node with the side-entry node, (B) obtains the list of installed packages, (C) downloads and installs missing pre-requisite packages, if any, (D) configures and starts reverse proxy service 34, (E) configures and starts the bootstrap REST API service 32, (F) configures network time protocol with well-known service provider, (G) registers with site-entry node, passing secret key, if required, waits for site-entry node to become available request, if not serviced immediately, if registration request is accepted, the site-entry node (the selected leading node) will provide security certificates for communicating with site-entry services, (J) pulls all required container images from the site-entry node's local container image registry, (K) configures the node's memory, sysctl, udev, friov, and resource limit settings, (L) discovers detailed node inventory (CPU, memory, storage devices) and persists in the configuration data server 26 on the site-entry node, and (M) reboots the node, if changes in the system settings dictate that the system reboot is required.

Further, the logic flows to Step 4 "(One storage node) cli site configuration generate", where the second phase of the subject process 100 begins. In Step 4 a site configuration is automatically generated based on the inventory of storage nodes and storage devices discovered during Steps 1-3 constituting the bootstrap (first phase) operation of the subject process.

In Step 4, the subject process performs the following operations for the selected leading node:

(A) a default configuration specification is generated with the provision that:

each remaining storage node registered with the selected leading node hosting mandatory services, optional services are (by default) hosted on each remaining registered node (flags are preferably used to indicate which services are to be included in the configuration, and configuration data services 26 are normally hosted on 3 remaining nodes separated from one another by failure domain definition;

(B) upon generating a default configuration specification, from User Interface service processor 30 or from CLI (Command Line Interface), configuration attributes can be added or modified, including memory and CPU allocation per individual service and data that may not be discoverable (for example, as data center location), (C) following addition of the configuration attributes, the logic performs the modification of the service placement on the remaining storage nodes, and (D) if an external configuration data service is used, it is specified.

Upon completing Step 4, the storage administrator may review the storage configuration and subsequently apply the configuration to bring the storage system to the "available" state.

Following Step 4, the logic advances to Step 5, for executing the CLI site update for the selected leading storage node. After the storage administrator has reviewed the site configuration specification, it is applied to the collection of storage nodes so that:

(A) shared deployment environment attributes are published into a configuration file 26 on each storage node, (B) on each storage node, the specified services are configured and started with a requested resources so that:

a container start specification is generated for the specified resources available on each storage node, including the specific network adapters, storage devices, and CPU cores, each service is started using the container start specification, and security certificates are published to each storage node for the services deployed on that storage node, and (C) the deployment manager service monitors the state of each service on every storage node and will restart or move containers as dictated by state of the resources in the configuration.

Upon executing Step 5, after the specified services are deployed across the collection of the storage nodes, a storage cluster is created in Step 6 by the command "CLI cluster create <name>" that utilizes a computer and storage resources previously discovered in Steps 2 and 3. There is a single command to create and start the storage cluster, and, at that point, the storage is ready for use.

Specifically, in Step 6, the logic performs the operations of:

(A) the detailed hardware inventory is refreshed to provide an up-to-date view of the available resources provided by each storage node, (B) default configuration settings are added to the cluster configuration, (C) the storage devices specified in the storage configuration are formatted for use by the storage system, (D) a storage cluster is instantiated and started using the resources and settings in the cluster configuration, (E) initial metadata objects (tenants, data set (pool)) are created, (F) at this point, the storage system is ready to use, and in the final step (G) the storage administrator may choose to modify the cluster configuration, adding or removing resources or changing configuration parameters, as necessary.

In the subject method, preferably, the configuration data service containers are deployed in different failure domains to the extent possible.

The subject method, as presented in previous paragraphs, features automatic discovery of available resources, automatic bootstrapping/tuning of the base system, automatic registration of all configured nodes, and automatic distribution of SDS images to all configured nodes with the advantage of minimizing administrative effort and reducing the time required to deploy the SDS cluster, and removes human errors, as well as insures consistent deployment across the SDS cluster.

Figure 4A:
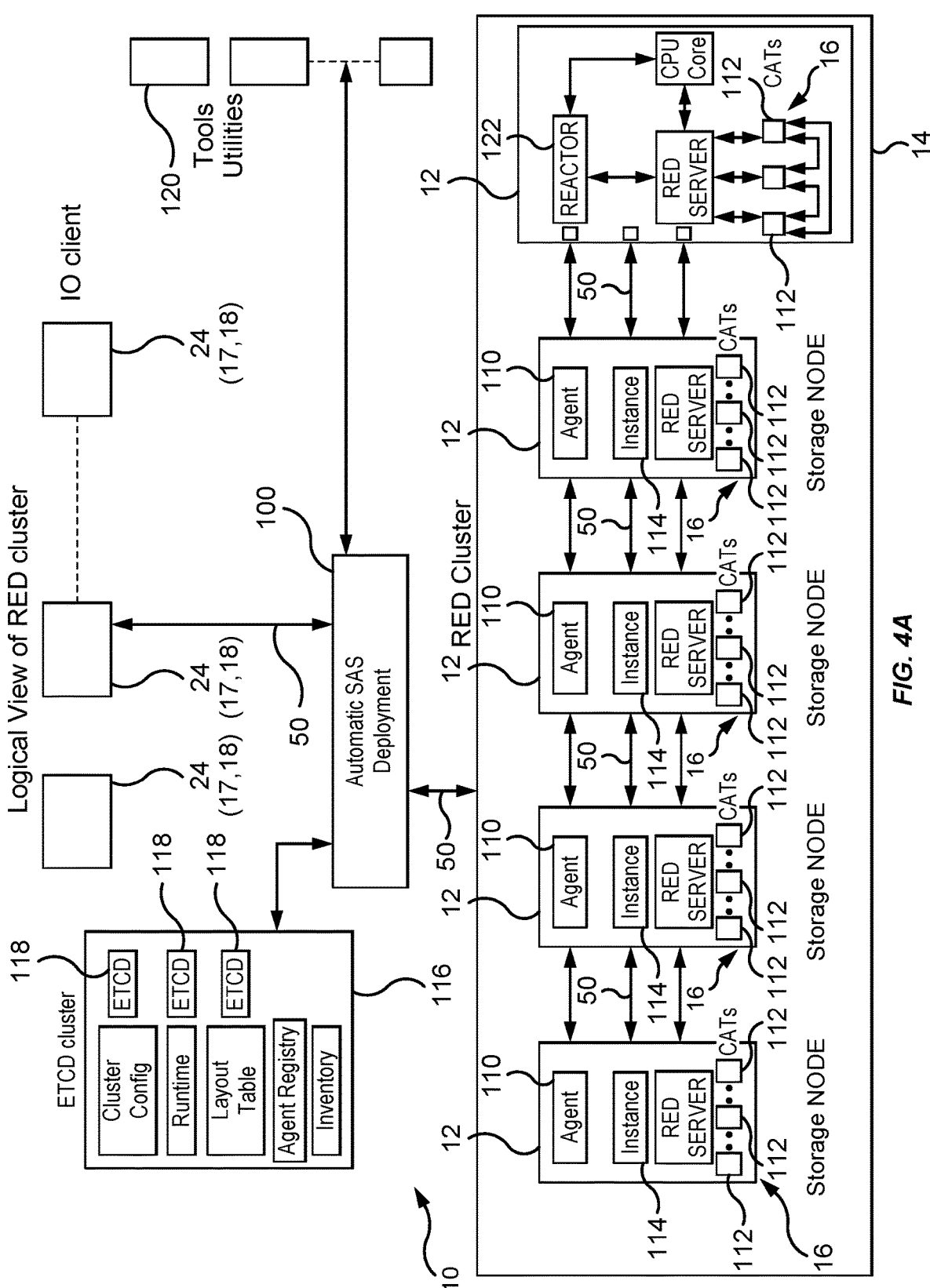
FIG. 4A is a logic block diagram of the exemplary SDS system supporting the subject SDS automatic deployment method.
Figure 4B:
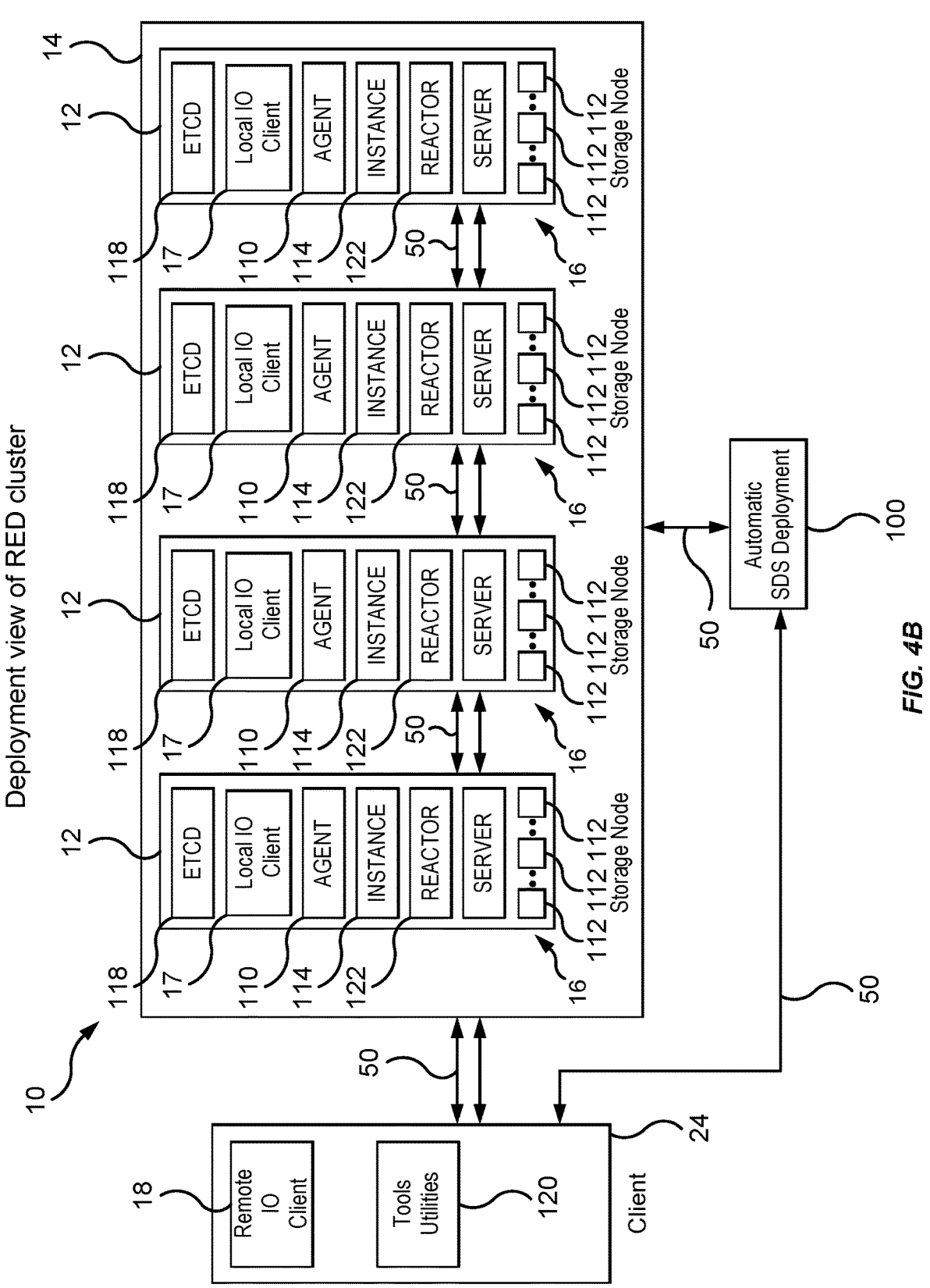
FIG. 4B is representative of the deployment view of the exemplary SDS system supporting the present SDS automatic deployment method.

The subject method is supported, as an example, by the data storage system presented in FIGS. 4A-4B, where each node 12 in the cluster 14 may be configured with a plurality of processing units for executing services needed for operation of the software defined storage system, and specifically, in the context of this Patent Application, for supporting automatic SDS deployment processing unit 100 operatively coupled to each data storage node 14.

Each node 12 may be configured with an Agent 110 (also referred to herein as an Agent Processing Unit) which supports a Management Process running on the node 12 which monitors the nodes 12 and their functionality. Each node 12 may be configured with an array 16 of local storage devices, which may include a plurality of Core Affined Storage Targets (CATs) 112. The data storage system in the cluster 14 in the present system 10 may exploit a large array of non-volatile memory (NVM) devices 112 which are arranged in a plurality of clusters 14 where the nodes 12 may communicate with other nodes 12 in the same storage cluster 14 or with specified nodes in other clusters 14.

Each node 12 may also be configured with a corresponding Instance 114 (also referred to herein as an Instance IO Server Processing Unit) which supports an IO server process running on the compute node 12. Instances 114 are generated (created) by the Agents 110. Instances 114 are connected to the local CATs 112 and supply IO services to clients 24. As best shown in FIG. 4A-4B, clients 24 are represented by the local clients 17 (local to the compute nodes 12) and remote client(s) 18.

As shown in FIGS. 4A and 4B, the system 10 may further include a configuration database (for example, ETCD cluster) 116 which is a highly available distributed configuration database. The configuration database 116 stores cluster configuration, runtime, layout table, agent registry, and Inventory. The configuration database 116 also includes databases 118 which, as best shown in FIG. 4B, reside in respective compute nodes 12.

Also depicted in FIGS. 4A and 4B is a set of tool utilities 120 which are configured for communication with the Agents 110 and the configuration database 116 to create, start, stop the cluster operation, OR query the status, etc.

FIG. 4B is representative of the physical view of an exemplary embodiment of the cluster 14. In one of numerous exemplary embodiments, the compute nodes 12 in the cluster 14 may run various Linux containers using Docker/k8s. In this exemplary embodiment, the Agent 110 and the Instance 114 run in a single Linux container, with the Agent container controlling the access to the local CATs 112. As shown in FIG. 4B, in one of the possible embodiments, three servers 118 of the configuration database 116 may run on any three compute nodes 12 in the cluster 14. As depicted in FIG. 4B, the cluster 14 may be operatively coupled to a remote IO client 18 and the tool utilities 120.

The Instance IO server processing unit 114, also referred to herein as Instance, may reside in the cluster 14. The Instance IO server processor unit 114 is executed by different threads running within the Instance. These threads may include a Cluster Manager thread which is responsible for handling the cluster management, Instances and CATs, Evicts and joins from and to the cluster 14, makes all the intelligent decisions to grow and/or shrink the cluster, and communicates with the configuration database, as well as publishes the run time.

The Instance 114 may further include an Instance Manager thread which is responsible for Local Instance configuration management, and monitors and controls all of the needs of the Local Instance. The Instance Manager is also responsible for, among other functions, controlling the openings and closures of the CATs, sampling the gossip operation from the Gossip Manager and publishes the Gossip to the CATs.

Reactor threads are also included in Instance 114. The Reactors 122 may be bound to a specific cluster and run different tasks. For example, Reactors may run handler tasks (handler processing units) which are responsible for replication and routing requests from clients/servers to local CATs or remote Instances 114. The reactor thread may run a task which may be specific to Gossip manager which is responsible for the scalable broadcasts of essential information. Gossip Manager provides Gossip information to all sub-systems, while the Cluster Manager and Instance Manager may publish data and information over the Gossip messages.

The operation of the nodes 12 in cluster 14 depends on the system application. They may function as servers, super-computing clusters, etc., and have a capacity to "write" by outputting the data to an external memory, as well as "read" data from an external memory, or other type storage media.

As presented in the previous paragraphs, the present method for automatic deployment of software defined storage (SDS) is performed in two set-up services, including:

Bootstrap service 20 which ensures all OS level prerequisites are met (where the prerequisites provide that the base OS is supported type and version, all nodes names are resolvable from all nodes, and memory and CPU meet minimum requirements), starts the deployment REST server, and if needed, initiates reboot; and REST deploy server 32 performs the cluster creation and management after it is started by deployment server. The REST deploy server 32 is the lightweight deployment REST API server which is capable of start the services.

On startup, the bootstrap service detects if OS configuration changes are needed, makes those changes, and reboots the service. After the reboot, the bootstrap phase will pass all of the reboot checks, enter deploy server node, and accept client commands to complete configuration steps.

Bootstrap Phase Performs the Following Steps:

1. Verify root access
2. Query installed packages and install any missing prerequisites.
3. Configure docker for non-root access.
4. Pull container images from a supported container registry.
5. Run container image deploy to extract files and tools used for cluster startup.
6. Update security limits.
7. Configure hugepages (allocate a tunable (depending on the workload) portion of the system memory to hugepages and update grubline if necessary).
8. Reboot node if system parameters were changed.
9. Add other system prerequisite checks, like total memory, OS level, drivers, CPU cores, etc.
10. Pull red images on one (or a subset of all) RED server nodes and configure the container registry on those nodes to enable access from the remaining nodes so that only one external pull is required. The remaining nodes will pull from the first local registry.

To run setup, either install with DEB or RPM, or download EXE from GCP and execute.

REST Deploy Server Phase

1. Using the lightweight REST API server 32 for deploying the system components on a single node and verifying that those components are operational.
2. Receive the key based authorization.
3. Optional: start configuration database server on the node.
4. Create required env variables passed by deploy client.
5. On the server node, start the instance container, including the following steps:
   (a) Load specialized device driver for each storage device that will be used by the software defined storage cluster.
   (b) Optional: Assign specific CPU cores to each function executing in the cluster instance container; assign specific CPU cores to data services running in data service containers.
   (c) Query agent status to verify success.

REST Deploy Server Phase Performs the Following Steps:

On client node:
Publish required env variables passed by deploy client
Query agent status to verify success.
On REST API node:
Publish required env variables passed by deploy client
Start api docker container
Query container status to verify success.

Deploy Client Cli's:
Can be run from any node with http access
Passes user input to redsetup to setup RED services.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of elements, steps, or processes may be reversed or interposed, all without departing from the spirit or scope of the invention as defined in the appended claims.

What is claimed is:

1. A method for automatic deployment of software defined storage, comprising:
   (a) establishing a data storage system comprising at least one storage cluster associated with a plurality of data storage nodes,
   (b) operatively coupling an automatic software defined storage (SDS) processor unit to said data storage system,
   (c) configuring said automatic SDS processor unit for performing automatic SDS deployment process, and executing said automatic SDS deployment process by:
   (d) downloading a bootstrap package from a cloud storage and installing the bootstrap package in each of said plurality of data storage nodes, and executing a bootstrap phase of said automatic SDS deployment process for said plurality of data storage nodes to obtain an inventory and the storage configuration of said plurality of data storage nodes, in said bootstrap phase, selecting a leader data storage node of said plurality thereof and initiating the bootstrap phase for said leader data storage node by issuing a "site entry" argument, resulting in installation of prerequisite packages and setting the leader node parameters for said leader data storage node, and selecting remaining data storage nodes other than said leader data storage node, and, for each remaining data storage node, initiating the bootstrap phase by issuing a "-site-entry address <leader-note>" for said each remaining data storage node, resulting in installation of prerequisite packages, setting said each remaining data storage node parameters, and registering said each remaining data storage node with said leader data storage node, and
   (e) automatically generating a site configuration of said data storage system based on said inventory and storage configuration of said plurality of data storage nodes obtained during said bootstrap phase.

2. The method of claim 1, further comprising:
   (f) subsequent to said step (e), creating at least one storage cluster utilizing said inventory and storage configuration of said plurality of data storage nodes, and said site configuration of said data storage system.

3. The method of claim 1, further comprising:
   in said step (d), configuring and starting local container image registry for said leader data storage node, pull required container images from a secure container image registry, and pushing required images to the local container image registry.

4. The method of claim 1, further comprising:
   in said step (d), persisting said data storage node inventory to a configuration data service processor unit of said leader data storage node.

5. The method of claim 1, further comprising:
   in said step (d), upon downloading the bootstrap package, providing a secret key to said leader data storage node and to said remaining data storage nodes to facilitate registering thereof with said leader data storage node, and, upon registering said remaining data storage nodes with said leader storage node, waiting, by said remaining data storage nodes, for said leader data storage node to become available, if a registration request is not serviced immediately.

6. The method of claim 5, further comprising:
   in said step (d), from said leader data storage node and remaining data storage nodes, configuring and starting reverse proxy service processor unit, configuration data service processor unit, bootstrap REST API service processor unit, API service processor unit, and User Interface service processor unit.

7. The method of claim 6, further comprising:

deploying configuration data service containers in different failure domains.

8. The method of claim 7, further comprising:

upon accepting the registration request from at least one remaining data storage node, issuing at least one security certificate, by said leader data storage node, for said at least one remaining data storage node, for communication with said leader data storage node.

9. The method of claim 6, further comprising:

upon executing said step (d), rebooting at least one of said leader data storage node and remaining data storage nodes.

10. The method of claim 5, further comprising:

in said step (d), configuring network time protocol with a service provider for said leader data storage node and remaining data storage nodes.

11. The method of claim 5, further comprising:

in said step (e), automatically generating, by said automatic SDS deployment processor unit, on said leader data storage node, a default configuration specification of each remaining data storage node registered with said leader data storage node hosting prerequisite services, and modifying inventory attributes allocation for each prerequisite service and data.

12. The method of claim 11, further comprising:

in said step (e), modifying services inclusion on said data storage nodes.

13. The method of claim 12, further comprising:

in said step (e), specifying, by said automatic SDS deployment processor unit, if an external configuration data service is used.

14. The method of claim 11, further comprising:

subsequent to said step (e), applying said site configuration specification to a collection of said leader data storage node and remaining storage nodes registered with said leader data storage node, publishing, into a configuration file of each of said data storage node of said collection thereof, shared deployment inventory attributes, on said each data storage node of said collection thereof, configuring and starting specified services with resources required by said specified services, and monitoring a state of each of said services specified on said each data storage made in said collection thereof.

15. The method of claim 11, further comprising:

subsequent to said step (e), deploying specified services across a collection of said leader data storage node and remaining data storage node and remaining data storage nodes registered with said leader data storage node, creating a storage cluster, refreshing hardware inventory of data storage nodes of said collection thereof, thus providing an up-to-date view of available resources of each data storage node in said collection thereof, adding default configuration settings to said storage cluster configuration, and formatting storage devices specified in said storage configuration for use by said storage system.

16. The method of claim 15, further comprising:

instantiating said storage cluster, and starting said storage cluster using resources and settings in the storage cluster configuration.

17. The method of claim 16, further comprising:

creating initial metadata objects for said storage cluster configuration, thus making said storage system ready to be used, and modifying the storage cluster configuration if needed.

* * * * *